E. BALL.
2 Sheets—Sheet 1.
Harvester.
No. 831.
Reissued Sept. 27, 1859.
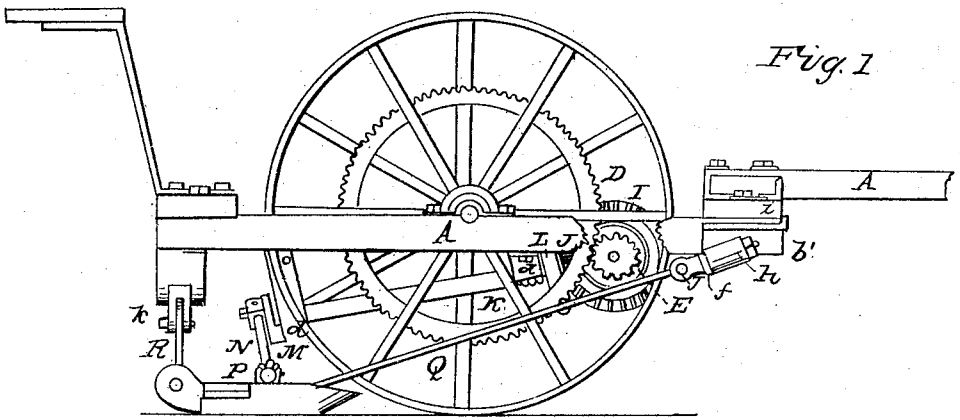
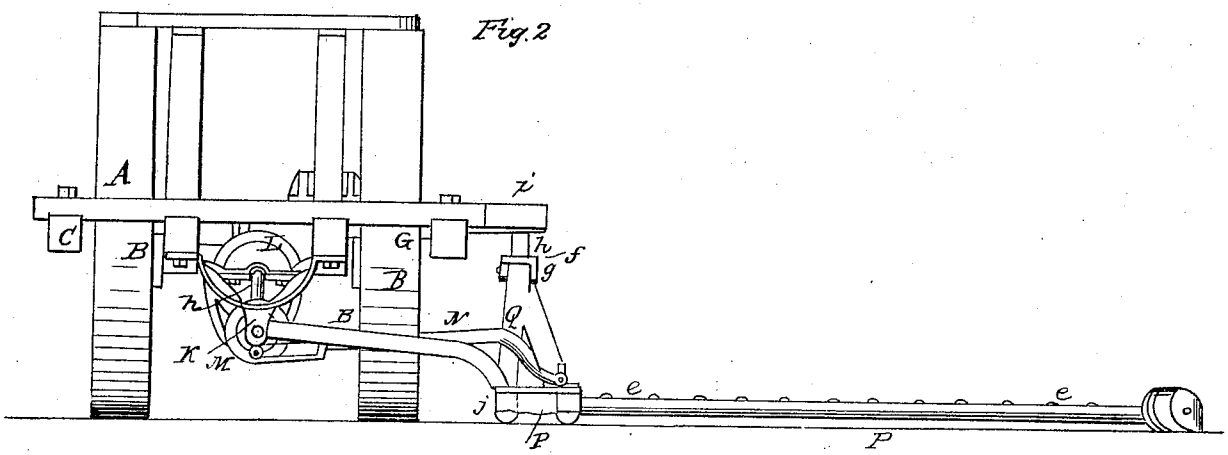
Witnesses
Thos H. Dodge
J. L. Adams
Inventor
E. Ball
N. PETERS, Photo-Lithographer, Washington, D. C.

2 Sheets—Sheet 2.
E. BALL.
Harvester.
No. 831.
Reissued Sept. 27, 1859.
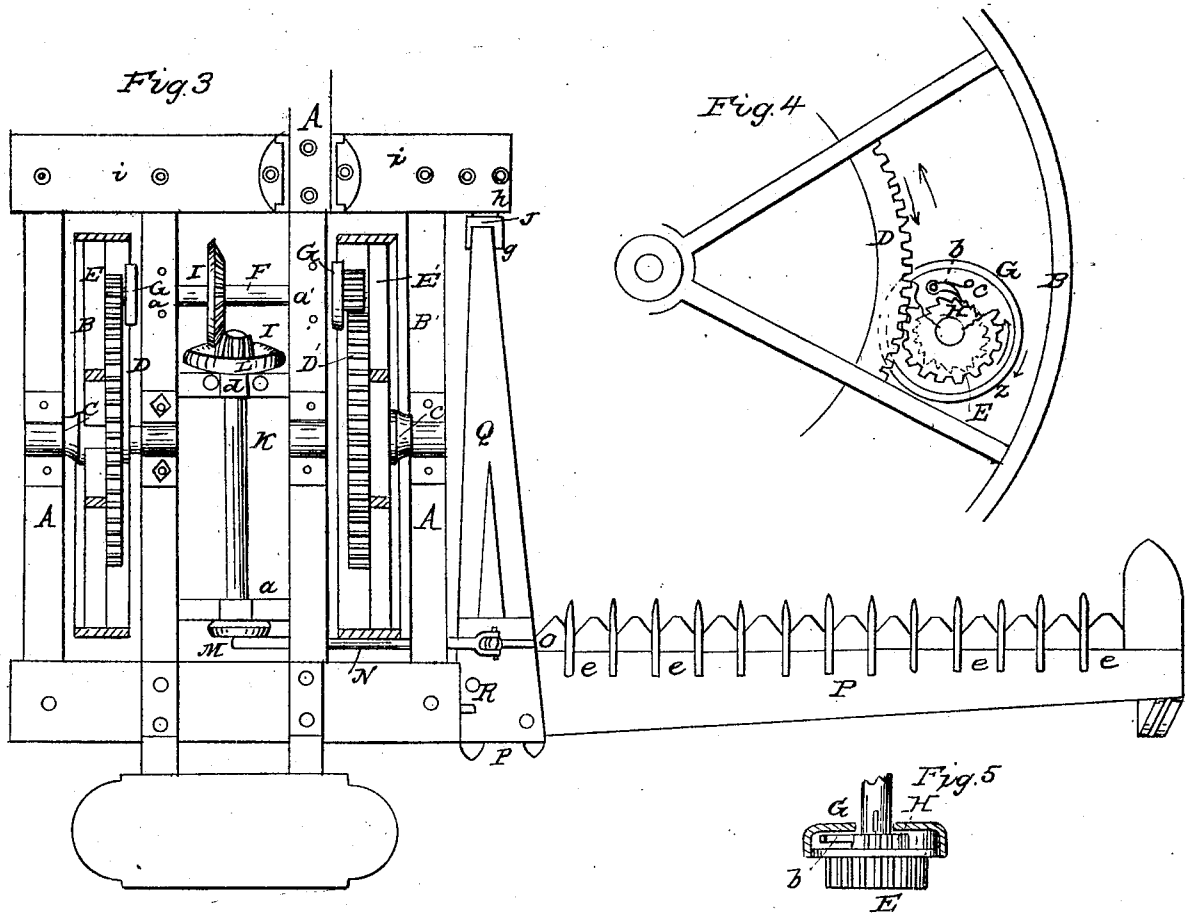
Witnesses
Thos H. Dodge
J. D. Adams
Inventor
E. Ball
N. PETERS, Photo-Lithographer, Washington, D. C.

UNITED STATES PATENT OFFICE.

E. BALL, OF CANTON, OHIO, ASSIGNEE, BY INTERMEDIATE ASSIGNMENTS, OF E. BALL AND JOHN BUTLER, ASSIGNEES OF SAID E. BALL.

IMPROVEMENT IN MOWING-MACHINES.

Specification forming part of Letters Patent No. 18,788, dated December 1, 1857; Reissue No. 831, dated September 27, 1859.

DIVISION A.

*To all whom it may concern:*

Be it known that I, E. BALL, of Canton, in the county of Stark and State of Ohio, have invented certain new and useful Improvements in Grain and Grass Harvesters, better known as "Ball's Improved Ohio Mower;" and I do hereby declare that the following is a full, clear, and sufficient description thereof, reference being had to the annexed drawings, making part of the same, of which—

Figure 1 is a side view of my machine. Fig. 2 is a rear view of the same. Fig. 3 is a plan or top view of the same. Fig. 4 is a detached view of one of the pinions and a portion of one of the spur-wheels, pawl and ratchet of the pinion being shown. Fig. 5 is a detached plan or top view of one of the pinions.

In the accompanying drawings, A represents the frame of the machine, which is of rectangular form, and is supported by two independent driving and supporting wheels B B′, with separate axles C and C′. Spur-wheels D D′ are secured to the inner sides of the spokes of the wheels B B′ and gear into pinions E E′, which play loosely on the ends of a horizontal shaft, F, which runs in suitable bearings, *a a′*, on the frame A.

To the shaft F there are permanently secured two caps or cases, G G′, within each of which a pawl, *b*, is secured, and these catch into ratchet-teeth H, which are attached to the inner sides of the pinions E E′. (See Figs. 4 and 5.) The pawls have small springs *c* directly over them—one over each—which keeps them in the ratchet-teeth, while the cases G G′ exclude dirt and cut stalks of grain or grass from interfering with the proper action of the ratchet-teeth and pawls.

I is a bevel-toothed wheel securely attached to the shaft F, and gears into a bevel-pinion, J, at the upper end of the inclined crank-shaft K, which runs in suitable bearings, *d d*, attached to the under side of the frame A and below the axial line of the wheels B B′.

Directly back of the pinion J, on the shaft K, there is a fly-wheel or balance, L, which serves to prevent little irregularities in the action of the machine or of its wheels from affecting the action of the sickle. At the lower end of the shaft there is a crank-pulley, M, to which one end of a connecting-rod, N, is attached, the opposite end being pivoted to a sickle, O, working between fingers *e e* upon the finger-bar P.

To the inner end of the finger-bar P there is rigidly secured at right angles thereto an inclined wide flat plate or bar, Q, the upper end of which is attached to a wrist or swivel, *f*, by pivot *g*, forming a joint or hinge, the wrist *f* being itself secured within a cylindrical socket, *h*, by a nut, *h′*, which screws upon the end of said wrist, as seen at Fig. 1.

To the lower end of the plate or bar Q, which serves the purpose of a shoe to support the heel of the finger-bar, a brace or coupling arm, R, is connected by a pivot, *j*, the outer end of said brace or coupling-arm being attached to a hanger depending from the back part of the frame A by a pivot, *k*.

As the machine is drawn along by the rigid draft-pole A′ the driving-wheels B B′ move in the direction indicated by arrow 1, (see Fig. 4,) and the spur-wheels D D′, moving in the same direction, cause the pinions E E′ to move in the direction of arrow 1′. The ratchet-teeth H, catching against the pawls *b*, cause the shaft F to rotate, and motion is thereby communicated to the sickle O through the shaft K and connecting-rod N. In case of the machine being moved backward the sickle O is not operated, as the spurs and pinions are then moved in the direction indicated by arrows 2 and 2′, and the ratchet-teeth H slip underneath their respective pawls. The finger-bar P, which supports the sickle O, is permitted to rise and fall bodily, or either end may rise and fall, according to the irregularities of the ground, in consequence of its connection to the frame A by the bar Q, since the pivot *g* allows the finger-bar and bar Q to rise and fall bodily, and the ability of the rod *f* to turn in the socket *h* permitting either end to rise and fall, while the brace-rod R serves to steady the finger-bar while it is moved, and to prevent it from being wrenched out of place by the resistance of the grass or of obstacles, and thus the finger-bar is under all circumstances at liberty to conform to the unevenness of the ground, and consequently the sickle will perform its work better and with greater uniformity than it otherwise could do.

My machine is well adapted for use on rough land, and in case small obstructions should present themselves in the path of the inner shoe when the finger-beam is raised at its outer end no injury is liable to result to the machine, since the flexible nature of the joints of the coupling-arm, together with the joints of the brace Q, (or its equivalent,) permits the heel of the finger-beam and inner shoe to rise and fall, to pass over the obstructions, or conform to the inequalities of the ground. The connections of the finger-beam are also such that, when necessary, the finger-beam can be first raised up bodily and then the outer end turned up at an angle of about forty degrees by hand or by an attendant upon the ground.

In a grain and grass harvester great strain comes upon the finger-beam, and it is important that it should be attached by means having sufficient strength to resist any sudden strain, and for this purpose the coupling-arm is hinged to the frame or something attached thereto, while the finger-beam is firmly attached to the rear end of bar Q, which is hinged to the front of the machine, so that any sudden strain exerted on the finger-beam in turning the machine or otherwise is borne by the connections both in front and rear of the axial line of the main wheels.

To obviate the danger of throwing the guard-fingers out of their proper and relative position as respects the cutters, I hinge the coupling-arm to the main frame in the same or nearly the same vertical plane with the center of the crank-shaft, while the other end is hinged to the lower end of the brace or plate Q, (which serves the purpose of a shoe,) while the forward hinged connection is such that the motion of the finger-beam, when the outer end only is raised above the inner end, shall be in the arc of a circle the center of which shall be in a line parallel to the line of motion of the machine, and on a line on the inside of the machine and at the joint of the coupling-arm next the finger-beam.

With a view of making a strong and durable machine, while preserving the hinged connections so important to the practical operation of the machine, as before stated, I connect the finger-beam rigidly to the lower end of the plate Q, which serves the purpose of a shoe and support to the finger-beam, and extend said plate so as to connect it with the front of the machine by a joint, so that the draft of the finger-beam and cutting apparatus is through a connection attached to the front of the machine and forward of the driving-wheels and finger-beam.

As the coupling-arm R is liable to sudden strains, I hinge it directly to the lower end of the bar or plate Q, which serves the purpose of a shoe, by means of two lugs rising up through the top or cap plate, P′, so that it has a durable connection, which is not liable to be broken off or become loose.

I usually turn my machine, when cutting grain or grass, next to the fence, so that the wheel B remains stationary, or has but little motion while turning corners, and if the wheel B′ were rigidly attached to the same shaft there would not only be a great difficulty in turning, but the machine would be liable to be wrenched, while the cutters would be sure to get clogged. To obviate these difficulties I employ an independent supporting and driving wheel, B′, so that while the side of the machine next the short finger-beam is well sustained the cutters are driven at a sufficient velocity while turning corners on uneven ground, or to pass obstructions to do good work, and thus prevent all clogging, which is sure to result from a slow or no motion of the cutters when the finger-beam is moved forward.

By the use of two independent supporting and driving wheels, in combination with a finger-bar connected as described, either of the wheels can rise or fall without affecting the movements of the finger-bar or of seriously interfering with the cutting apparatus, for if one wheel happens to drop into a hole the other wheel continues to operate the cutters; or if one wheel strikes suddenly a stone or stump, as is often the case, with such force as to stop the wheel and turn the machine to one side, still the cutters are worked by the other wheel. When both wheels are worked together a very powerful stroke of the cutters is obtained, and although it is necessary to run the crank-shaft at a very high velocity, I avoid jarring and wrenching of the machine by arranging the crank-shaft below the axial line of the main wheels, below the main frame, and between the driving-wheels, and gear to one end of it and on one side of the axle of the supporting-wheels, while the pitman is connected to the other end and on the opposite side of the axial line of the supporting-wheels.

The plate Q, the lower end of which serves the purpose of a shoe and support to the finger-beam, being hinged at its forward end, so that it can rise and fall and also turn, passes over obstructions much easier than it would if it could not yield, while the action of the machine is much more uniform than it would be if it were to be tipped back and forth by every little obstruction which happened to be in the path of the shoe part of plate Q.

It will be observed that the arrangement and construction of the various parts of the machine are such that no part of the machine is liable to catch the cut stalks either in rear

United States Patent Office

PTO - BOYERS, PA Duty Station

MISSING PAGE TEMPORARY NOTICE

PATENT # Re831 FOR ISSUE DATE 9-27-1859

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE p. 3 of title + rest.

N1 A. Bayers at 11-3-92.

Data Conversion Operation

Boyers, Pa